(12) United States Patent
Cama et al.

(10) Patent No.: US 10,055,411 B2
(45) Date of Patent: Aug. 21, 2018

(54) MUSIC RECOMMENDATION ENGINE

(71) Applicant: INTERNATIONAL BUSINESS MACHINES CORPORATION, Armonk, NY (US)

(72) Inventors: Karl J. Cama, Southlake, TX (US); Andrew R. Freed, Cary, NC (US); Norbert Herman, Denver, CO (US); Shubhadip Ray, Somerset, NJ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/928,084

(22) Filed: Oct. 30, 2015

(65) Prior Publication Data

US 2017/0124074 A1 May 4, 2017

(51) Int. Cl.
*G06F 17/30* (2006.01)

(52) U.S. Cl.
CPC .... *G06F 17/3005* (2013.01); *G06F 17/30035* (2013.01); *G06F 17/3053* (2013.01)

(58) Field of Classification Search
CPC ........... G06F 17/30702; G06F 17/3005; G06F 17/30035; G06F 17/3053
See application file for complete search history.

(56) References Cited

U.S. PATENT DOCUMENTS

| | | | | |
|---|---|---|---|---|
| 8,688,699 B2* | 4/2014 | Eggink | ............. | G06F 17/30702 707/732 |
| 2006/0293909 A1* | 12/2006 | Miyajima | ............. | G01D 5/345 709/204 |
| 2011/0016394 A1* | 1/2011 | DuKane | ............. | G06F 17/30056 715/716 |
| 2011/0307354 A1* | 12/2011 | Erman | ............. | G06F 8/60 705/27.1 |
| 2014/0031961 A1 | 1/2014 | Wansley et al. | | |
| 2014/0074269 A1 | 3/2014 | Weston et al. | | |
| 2014/0156676 A1* | 6/2014 | Brust | ............. | G06F 17/30554 707/748 |
| 2015/0297109 A1* | 10/2015 | Garten | ............. | A61B 5/04845 600/544 |
| 2017/0031996 A1* | 2/2017 | Priness | ............. | G06F 17/30528 |
| 2017/0206557 A1* | 7/2017 | Abrol | ............. | G06Q 30/0261 |

* cited by examiner

*Primary Examiner* — Tarek Chbouki
(74) *Attorney, Agent, or Firm* — Schmeiser, Olsen & Watts, LLP; William H. Hartwell

(57) ABSTRACT

A method and system implemented for generating a music recommendation intended to surprise and delight a user using data and computer analytics. The method and system collects and categorizes musical preferences using past preferences, user demographics, social media data and psychological variables which include the Big-5 personality traits of the user to generate a profile containing preferred musical parameters. The method and system categorize music based on different dimensions and compare music with a user generated profile containing preferred music parameters. The method and system may search for additional music across two vectors, parameters that closely resemble the preferred musical parameters, and outlying parameters that extend outside the preferred parameters, in order to locate and present musical recommendations that have similarities to the preferred music of the user, but variable enough to surprise and delight the user.

17 Claims, 3 Drawing Sheets

MUSIC RECOMMENDATION ENGINE

TECHNICAL FIELD

The present disclosure relates generally to analytics and applications using analytical data to generate and present customized recommendations and offers.

BACKGROUND

Broadcasting media has traditionally been the preferred approach for distributing content to an audience. There are many means for distributing content, such as radio, television and cable systems, as well as physical and digital delivery systems for printed media such as newspapers and magazines. One defining trait of traditional broadcasting is that the audience (alternatively listeners, viewers, readers, etc.) play a passive role. The audience may have only indirect effect on the actual content that is delivered, for example using ratings and identifying the size of the audience. Typically, the owners of a distribution channel select content according to their interpretation of the collective preferences of their target audience. The selected content is then distributed to the user with the hope that their needs and preferences are satisfied.

Similarly, in the case of digital and over the air music radio stations, many stations adopt a musical style (e.g., country-western, blues, rock, electronic), and exclusively play music corresponding to that style. Often it is the user who must seek out the radio station that fits their tastes. Presently, there are numerous web content delivery services emphasizing music delivery to users according to their music styles and tastes. One feature available is a system wherein users select songs and the system then finds a number of other songs that sound similar to those selected. These songs, however, are specified, or found through search engines that find songs by genre or a pre-assigned description (e.g., heavy metal, country, etc.). The algorithms for finding similar music are narrow in scope and often linear in nature, playing songs with ensembles of musicians that share a common musician between them or focus on a single genre. The recommendations do not venture outside a small or limited scope and do not offer much more variety than the method of tuning into a standard over the air radio, directed toward a specific genre of music. More often than not, users of these music services enjoy music across multiple genres, or would actually enjoy music from several genres having differing arrays of compositions, that the user may enjoy but are unaware that they exist.

SUMMARY

A first embodiment of the present disclosure provides a method for generating a music recommendation to a user comprising: granting, by a processor, permission to collect user information from one or more data sources; storing, by the processor, the user information in a data store; generating, by the processor, a user profile from the user information, said user profile comprising preferred music parameters; selecting, by the processor, a plurality of music recommendation candidates from a repository, said plurality of music recommendation candidates each having a substantial number of parameters within a threshold range of the preferred music parameters, wherein at least one parameter is outside the threshold range; computing, by the processor, a similarity value and a surprise value for each of the music recommendation candidates; further computing, by the processor a recommendation value for each music recommendation candidate that balances the similarity value and the surprise value; and presenting, by the processor, the music recommendation candidate having the highest recommendation value to the user.

A second embodiment of the present disclosure provides a computer program product, comprising one or more computer readable hardware storage devices having computer readable program code stored therein, said program code containing instructions executable by the one or more processors to implement a method for generating a music recommendation to a user, said method comprising storing, by the processor, the user information in a data store; generating, by the processor, a user profile from the user information, comprising preferred music parameters; selecting, by the processor, a plurality of music recommendation candidates from a repository, said plurality of music recommendation candidates each having a substantial number of parameters within a threshold range of the preferred music parameters, wherein at least one parameter is outside the threshold range; computing, by the processor, a similarity value and a surprise value for each of the music recommendation candidates; further computing, by the processor, a recommendation value for each music recommendation candidate that balances the similarity value and the surprise value and presenting, by the processor, the music recommendation candidate having the highest recommendation value to the user.

A third embodiment of the present disclosure provides a computer system, comprising a processor, a memory coupled to the processor, and a computer readable storage device coupled to the processor, said storage device containing program code executable by the processor via the memory to implement a method for generating a music recommendation, said method comprising granting, by the processor, permission to collect user information from one or more data sources; storing, by the processor, the user information in a data store; generating, by the processor, a user profile from the user information, comprising preferred music parameters; selecting, by the processor, a plurality of music recommendation candidates from a repository, said plurality of music recommendation candidates each having a substantial number of parameters within a threshold range of the preferred music parameters, wherein at least one parameter is outside the threshold range; computing, by the processor, a similarity value and a surprise value for each of the music recommendation candidates; further computing by the processor, a recommendation value for each music recommendation candidate that balances the similarity value and the surprise value and presenting, by the processor, the music recommendation candidate having the highest recommendation value to the user.

DETAILED DESCRIPTION

Figure 1:
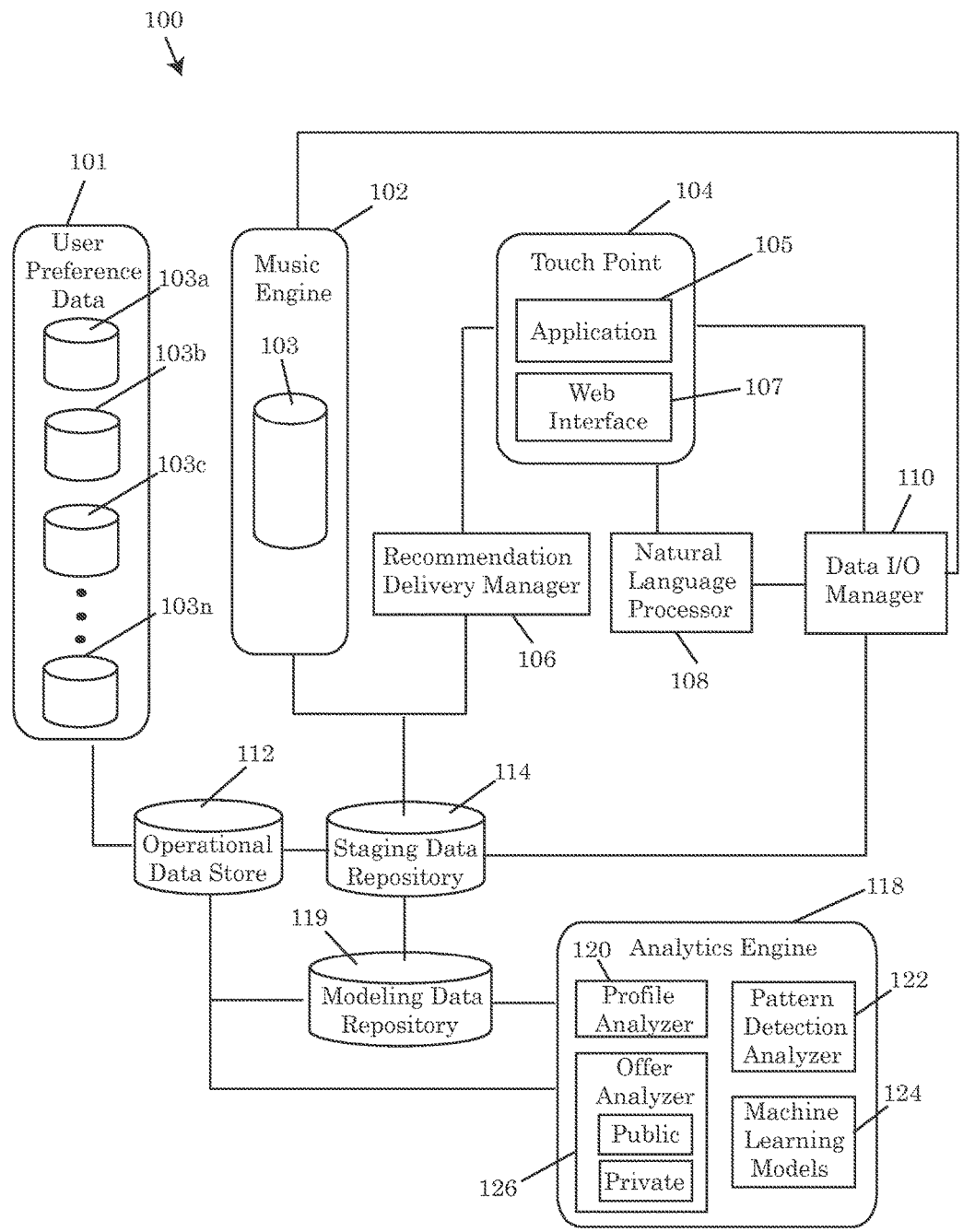
FIG. 1 is a diagram of system architecture, in accordance with embodiments of the present invention.

The present disclosure enables a method, computing system and computer program product for generating and delivering music recommendations to a user that will surprise and delight. Embodiments of the method, system and product for generating music recommendations customize the recommendations for each user based on the information collected, and through the use of an analytics engine, to generate a user profile identifying preferred music parameters that each user finds appealing. Using the generated profile and the information about each user's preferred musical parameters; a musical repository classifying songs, artists and performances according to similar parameters can be compared. Embodiments of the current disclosure not only using a similarity vector for identifying music recommendations, but instead, the music recommendation engine can further predict and present unexpected music recommendations that will surprise and delight the user, even though said recommendations include one or more musical parameters that fall outside a user's acceptable threshold range for the one or more preferred musical parameters.

The present invention is advantageous over other recommendation services and programs that make recommendations on a very narrow or limited algorithm, which makes predictions solely based on similarities. The recommendation engine of the present disclosure not only take into account similarities in may parameters such as the artist, genre of music, lyrical sentiment, musical construction such as the same time signature or beats per minute (BPM), but further identifies recommendations that include a sense of surprise, corresponding to deviations in parameters that a user may still enjoy, but fall outside the user's identified known parameters. Known recommendation methods are not dynamic, nor do they recommend music that has parameters knowingly determined to be outside of the user's preferences. A user utilizing a known recommendation method might as well use a directed search solution and filter the search results in order to identify similar music along the narrow band of possible recommendations.

The present invention utilizes methods to generate recommendations that are unexpectedly enjoyed by a user, despite having features which the user does not know if he/she might like or indicated the user has liked in the past. This concept of recommending music that includes characteristics and parameters that may differ from the user's typical listening habits is unintuitive, but useful for expanding a user's musical knowledge and horizons to include songs, artists, albums and performances that would normally not be known by the user or otherwise recommended to the user by recommendation software that only recommends music within a narrow scope of the user's known listening habits. The music recommendation engine of the current application provides music recommendations that deviate from one or more of the user's known musical parameters in a manner that will identify and present enjoyable music to the user that the user may not have considered or known about previously.

FIG. 1 depicts a diagram of an embodiment 100 of system architecture of the music recommendation engine. Embodiments of the music recommendation engine may include a user touch point 104 capable of receiving input from a user or provide output to the user, such as in the form of a recommendation or offer. The data being input and output from the touch point device 104 may be controlled, managed and delivered to other components of the music recommendation engine by a data I/O manager 110 in some embodiments. The touch point 104 may be defined as a point of contact between the customer (or user of the touch point device 104) and the music recommendation engine, the recommendation engine's products and/or services.

Embodiments of the touch point 104 can be any computing system, such as the computing system 90 generally described in FIG. 3 of this application below. Alternatively, the touch point 104 may comprise specialized computing hardware. Components of the touch point 104 may include but not be limited to one or more processors, memory storage devices, data storage devices, hard disk drives, graphics cards, sound cards, power supply, motherboard, display devices, input devices such as a keyboard or mouse, microphone, camera, biometric scanners and any other hardware known in the art.

In some embodiments, the touch point 104 may be programmed to execute code that will run the music recommendation engine 102. Embodiments of the recommendation engine may be displayed on the touch point device 104 as an application 105 or through a web interface 107. The application may include a program, group of programs or software services. The application 105 may be stored and executed locally from a storage device connected to the touch point device itself, or the application may be run remotely through a network or the internet. In other embodiments, the music recommendation engine may be loaded in the memory of the touch point device and accessed or viewed via a web interface 107. The web interface 107 may be provided to touch point 104 as part of a web service, software as a service (SaaS) or a platform as a service (PaaS) delivery method.

For example, the embodiments of the music recommendation engine may be downloaded from an application service such as the App Store on a touch point device 104 running an iOS platform, the Google Play Store found on touch points running an Android platform, or the Windows Store on a touch point device 104 running on a Windows platform. Alternatively, instead of downloading the application from application service, the music engine may be accessible through web browser loading the web interface 107 or another type of thin client.

In other embodiments, the music recommendation engine may be loaded into machines, apparatuses or touch point systems 104 specializing in the delivery of music and/or music recommendations. For example, in some embodiments, the music recommendation engine may be loaded into an information kiosk or computing system specialized to perform as an interactive jukebox. These specialized hardware embodiments may include read only memory (ROM), firmware, bios or other hardcoded software specifically designed to load the music recommendation engine and interface of the music recommendation engine upon booting the specialized computing system hardware. Specialized hardware embodiments may also include specialized circuits or circuitry. Other examples of touch point devices 104 may include desktop computers, laptops, servers, mainframes, smart phones, cell phones, tablet computers, jukebox, computerized watches, wearable computerized glasses, smart televisions or other smart appliances having network enabled features, video game consoles or workstations.

Embodiments of the music recommendation engine may collect and identify information about the users of the engine itself. Upon loading or accessing the music recommendation engine on the touch point device 104, the music recommendation engine may request that the user login or identify themselves via login credentials, for example using a username/password, keycard, pin number, biometric identification including fingerprint, iris scan or voice printing. By logging into to a specific user name or user ID, the music recommendation can save user preferences, track browsing, playlist, purchase history, ratings and reviews of recommendations and further refine recommendations as the user continues to provide data regarding their musical preferences to the music recommendation engine.

In some embodiments, the music recommendation engine may request permission to be granted for gathering user information from one or more data sources. User preference data 101 may be collected from numerous data sources which may be accessible locally on the touch point device 104, accessible via a computer network, or from data sources available on the internet. A data source can be any source where data or metadata can be collected from. Data sources may include both publicly available and private structured files, unstructured files, databases, data sets, data sheets, spreadsheets, XML files, flat files, computer logs, network performance logs, search engine logs, social media, data marts, data warehouses, web sites and web services and any other data source known in the art, especially any data sources that provide historical data regarding the user's musical preferences. In FIG. 1, each of the data sources are displayed by reference number 103*a*, 103*b*, 103*c* . . . 103*n*. The music recommendation engine is not limited to collecting information from a particular number of data sources, in fact the more data sources available, the more precise that a recommendation delivered by the music recommendation engine may be. The variable n in the nth reference number of 103 is intended to indicate there may be a variation in the number of data sources available, without being limited to a predetermined amount. Hereafter, "data sources" will collectively be referred to as "data sources 103."

Examples of data sources 103 that may provide useful information into the musical preferences of the user of the music recommendation engine may include data relating to music purchases, streaming habits, downloading habits, viewing habits including searching history or browsing history of websites, search engine history and viewing habits of catalogs presented by a music distribution service like iTunes, Napster, SonicMusic, Spotify, YouTube, Google Music and Amazon Prime Music, logs of viewed websites and website activity, published comments, ratings or reviews. Another useful source of data and metadata, may include digital music files locally stored, or stored on a network such as a cloud based storage solution. Digital music files, such as those in .Mp3, .Wmv, .CDA or other formats, may include id3 tags or other tag types that include specific file information such as the artist, song, album, year of publication, genre and file quality.

Not only are music purchases through digital distribution platforms great data sources for determining the musical preferences of a user, but also tracking information across the internet through various websites, web services and web applications may also provide insight into the preferences of the user. For example, web based and application based streaming services, including YouTube, Spotify, Pandora, Napster, Soundcloud, Amazon Music, Slacker Radio, and Shaazam can track, store and provide data surrounding the musical preferences of the user through the selections made by the user while the respective web or application service was running. This data may include information relating to the songs, albums and artists listened to, the number of times specific songs were repeated or listened through the entire length, favorite or saved songs, favorite genre, as well as disliked or songs that were skipped when they were played on the streaming services.

In addition to data sources 103 providing user preference data 101, information may also be collected about the user as an individual, from which additional music preference data, conclusions and inferences can be drawn. For instance, in some embodiments, the music recommendation engine may collect demographic information about the user. This demographic information may be collected from electronic forms, surveys and other direct information requests filled out by the user which was presented by the music recommendation engine. In other embodiments, the demographic information may be derived from one or more of the data sources, as part of the data being collected. Examples of demographic information about the user may include the user's age, marital status, education level, income, location, perceived socio-economic status, and other family members or relatives the user may be related to.

User preference data 101, collected from each of the available data sources 103 may be used to generate, update and save a user profile. This user profile may be entered and stored in a data store such as a repository, as a data set, a data table or as an entry in a database. In the exemplary embodiment, the user profile being generated may be stored in the operational data store 112. Embodiments of the user's profile may record and track the preferred music parameters of the user. "Preferred music parameters" may refer to attributes and level of attributes of music, derived from the user preference data 101, that a user finds to be appealing. These preferred music attributes may be very broad, or very specific, and may include parameters such as music genre, musical key (e.g. major and minor or more specifically the specific key such as C, A, F), time signature (4/4, 2/4, 3/4, 3/8, 6/8, 7/8, etc.), tempo (e.g. 70 beats per minute (BPM), 100 BPM, 120 BPM), recording date, volume, the pitch distribution of the treble, bass and mid tones, instrumental accompaniment and the sentiment of the lyrics.

The preferred music parameters may be constructed and consistently adjusted in real time or near real time using the analytics engine 118. The term "real time" may refer to the level of computing responsiveness that the user senses as immediate, nearly immediate or that enables the computer (such as the touch point device 104) to keep up with some external process, such as the user's most up to date preferences, or the context/environment in which music is being recommended. The analytics engine 118 may use predictive analytics to forecast future behaviors of the user based on the user preference data 101 being stored and sent to the analytics engine 118 for analysis. Namely, the analytics engine may predict the user's preferred musical parameters and predict a musical recommendation that will be considered enjoyable to the user.

The predictive analytics of the analytics engine 118 may use a set of one or more mathematical techniques or algorithms applied to the set of user preference data 101 to determine the probability that the user may enjoy the proposed musical recommendation. The analytics engine may apply one or more of the algorithms of the machine learning models 124 described below. Predictive analytics may be used to determine which characteristics of the user preference data, sometimes referred to as predictors, in a data set are clustered together. The technique is also used to determine whether, given a set of predictors, the value for some other characteristic is likely to fall within a desired range. In the exemplary embodiments of the music recommendation engine, the analytics engine may generate and update the preferred music parameters of the user profile by using k-means clustering, psycholinguistics analytics directed toward the "Big Five" personality traits, and the structured data provided as part of the user preference data.

K-means clustering is a method of vector quantization, allowing for the modeling of probability density function by a distribution of prototype vectors. When data mining, k-means clustering attempts to partition a specific number of n observations into a number of clusters, represented by the variable k. Each observation belongs to the cluster with the nearest mean, which serves as a prototype of the cluster. K-means clustering techniques can sort the data being supplied to the analytics engine into a number of clusters that are as distinct as possible. In general, the k-means method will produce exactly k different clusters of the greatest possible distinction. Using the data provided to the analytics engine, the analytics engine using k-means clustering will start with k random clusters, and then move objects between those clusters with the goal to 1) minimize variability within clusters and 2) maximize variability between clusters. In other words, the similarity rules will apply maximally to the members of one cluster and minimally to members belonging to the rest of the clusters. The result of a k-means clustering analysis, can assist in identifying the different number of musical parameters which are expected to be identified in the data, and then examine the means for each cluster, to identify preferred parameters for each cluster, or at the very least mean value and an acceptable range of variation that would be considered acceptable for the given cluster or musical parameter and then update the user's profile in the operation data store 112.

In addition to k-means clustering, the analytics engine may further implement psycholinguistic analytics to formulate inferences and draw conclusions about a user's preferences and personality traits. Based on the results of the psycholinguistics analytics, the analytics engine may update the user's profile to reflect these traits and conclusions. Psycholinguistic analytics may employ algorithms that combine the psychology of language with social media data. The psycholinguistics module of the analytics engine may ingest publically available and private data sources, to identify personality traits about the user to draw conclusions about the user's music preferences, purchasing habits and likelihood that the user may be suggestable towards enjoying certain musical parameters that may exist outside the preferred musical parameters. The analytics engine 118 may search data sources, such as social media data for psychographic variables. In the exemplary embodiments, the analytics engine may identify one of the "Big Five" variable personality traits to draw conclusions about the user. The Big Five variables refer to the user's extraversion, agreeableness, conscientiousness, neuroticism, and openness. Furthermore, the analytics engine may improve its assessment and profiling of a user by considering not only personality variables, but also life style variables and social class information extracted from the data sources. Life style variables may include such psychological information as to whether the user is resigned, a struggler, a mainstreamer, aspirer, successful, explorer or reformer.

Each of these personality traits and lifestyle types, when plugged into the psycholinguistics module may enhance the analytics engine's ability to use data sources to identify what musical parameters the user prefers and the types of variation that may be acceptable to the user. For instance, a person who has exhibited increased agreeableness may be willing to experiment with different genres having more variations in the musical characteristics. In another example, the amount of extraversion a user may exhibit may also influence the recommendations made and preferred musical parameters. For instance, a person who is more extraverted may enjoy faster music for dancing, while more introverted users may not enjoy faster music for dancing or may not enjoy dance music all together.

Using the psycholinguistics analytics in combination with clustering algorithms, the analytics engine may further employ statistical data modeling techniques to develop and create model from the user preference data, demographic data, psycholinguistic variables, lifestyle types and social class information. The user models for predicting user behavior and preferred music parameters may be stored in the modeling data repository 119 and updated periodically as new information is ingested by the analytics engine 118. The analytics engine may further engage in pattern matching analytical models to compare and contrast the user of the music recommendation engine with other user's models and profiles having similar clusters of data. The pattern matching may be calculated by extracting behavioral constraints which may be discovered using the clustering algorithms to compare user's having similar user preference data, demographics, personality traits, lifestyle types and socioeconomic factors. Modeling similar users having similar variables can further help the analytics engine to draw conclusions and inferences by making assumptions that similar traits and preferences will have similar preferred music parameters.

To assist the analytics engine 118 in performing the mathematical techniques and analysis of the many variables that make the composite user profile, the analytics engine may further include one or more modules or plugins. As shown in the exemplary embodiment of FIG. 1, the analytics engine 118 may comprise a profile analyzer 120, a pattern detection analyzer 122, machine learning tools 124 and an offer analyzer 126.

The profile analyzer 120 refers to a module or program tool that is able to correlate and correspond the incoming user preferences and data source information to a specific user profile. The profile analyzer ensures that information relating to a single profile of the recommendation engine is being analyzed in conjunction with the user preferences, demographic information and other variables derived from a specific user to draw conclusions about that user and update the user's profile accordingly. The profile analyzer 120, allows the analytics engine to retrieve profile attributes for a given profile or a profile associated with a given user name, in order to update the profile or previously generated models for predicting preferred musical parameters of a user.

The pattern detection analyzer 122 is a module for identifying patterns in the data that comprises the user profile. The module allows for machine learning that focuses on the recognition of patterns and regularities in the data which may allow for the analytics engine to draw conclusions about the user's preferred parameters. The pattern detection analyzer 122 may draw conclusions about patterns recognized within the data collected from the user as well as patterns identified when the analytics engine 118 has access to models and data of one or more other users who have a separate and distinct profile from the user. Types of pattern recognition that the pattern detection analyzer may engage in may include labelling a given input value, linear discriminate analysis, statistical classification, regression, sequence labeling (including speech tagging), and statistical inferences.

The machine learning models 124 of the analytics engine 118 provides a collection of the machine learning algorithms which allow for the analytics engine to evaluate the input data about the user and subsequently create or update the preferred musical parameters that make up the user's profile. The pattern detection analyzer 122 may use one or more of the machine learning models to draw conclusions and recognize patterns in the collected data. There are two general styles of algorithms that may be included as part of the machine learning models. The first grouping of algorithms may be referred to as "learning style" algorithms, while the second grouping may be referred to as algorithms that draw conclusions by similarity or function. Learning style algorithms may include supervised learning, unsupervised learning and semi-supervised learning algorithms, while algorithms that draw conclusions by learning or function may include regression algorithms, instance based algorithms, regularization algorithms, decision tree algorithms, Bayesian algorithms, clustering algorithms, association rule learning algorithms, artificial neural network algorithms, deep learning algorithms, dimensionality reduction algorithms and ensemble algorithms.

Supervised learning algorithms may refer to analytics techniques and algorithms that use training data where known input data having a known label or result teach the machine how to interpret unknown data being fed to the analytics engine. The supervised learning model places the analytics engine through a training process where the analytics engine is required to make predictions and is corrected when the predictions are wrong. The training process continues until the model achieves a desired level of accuracy on the training data. Examples algorithms that use supervised learning techniques include logistic regression and back propagation neural network.

Unsupervised learning is an analytics technique where input data is not labeled or does not have a known result. Instead, a model is prepared by deducing structures present in the input data. This technique may result in extraction of general rules. The algorithms, through a mathematical process, may systematically reduce redundancy, or it may be used to organize data by similarity. Example algorithms include Apriori algorithm and k-Means.

Semi-supervised learning analytics techniques are a combination of supervised and unsupervised learning. When using an semi-supervised learning technique, the input data provided to the analytics engine 118 is a mixture of labeled and unlabeled information. The machine must learn to construct a model by learning the structures to organize the data as well as make predictions.

Regression algorithms are a popular analytics model used in statistical machine learning. Regression models the relationship between variables that are then refined using a measure of error in the predictions made by the model. Some exemplary regression algorithms that may be used by the analytics engine 118 may include ordinary least square regression (OLSR), linear regression, logistic regression, stepwise regression, multivariate adaptive regression splines (MARS), and locally estimated scatterplot smoothing (LOESS).

Instance based learning models a decision problem with instances or examples of training data that are deemed important or required to the model. Such methods typically build up a database of example data and compare new data to the database using a similarity measure in order to find the best match and make a prediction. Focus is put on representation of the stored instances and similarity measures used between instances. Examples of this instance based learning algorithms may include k-nearest neighbor (KNN), learning vector quantization (LVQ), self-organizing map (SOM) and locally weighted learning (LWL).

Regularization algorithms are algorithms that act as an extension to other algorithms described in this application, usually regression techniques. The regularization algorithm may penalize models based on their complexity, by favoring simpler models that are more efficient at generalizing. Regularization algorithms may include ridge regression, least absolute shrinkage and selection operator (LASSO), elastic net and least-angle regression (LARS).

Decision tree algorithms may be one exemplary algorithm used by the analytics engine, in addition to the k-clustering techniques described above. Decision tree methods construct a model of decisions based on the actual values and attributes of the user data collected and provided to the analytics engine. The decision tree algorithm forks in tree structures until a prediction decision is made for a given record being analyzed. Decision trees may be trained on data for classification and regression problems. Examples of decision tree algorithms that may be used and applied to the collected data may include classification and regression tree (CART), iterative Dichotomiser 3 (ID3), C4.5/C.5.0, chi-squared automatic interaction detection (CHAID), decision stump, M5 and conditional decision trees.

Bayesian algorithms are methods that explicitly apply Bayes' theorem. These algorithms may generally be used for solving problems such as classification and regression. Popular Bayesian algorithms may include naïve Bayes, Gaussian naïve Bayes, multinomial naïve Bayes, averaged one-dependence estimators (AODE), Bayesian belief network (BBN) and Bayesian network (BN).

Clustering algorithms are generally directed toward created models that organize data collected into a centroid based and hierarchal structure. These methods, as described above when discussing k-means clustering, use the inherent structures in the data to organize the data into groups that have the maximum amount of commonality between the groups and the maximum amount of differences between groups. In addition to k-means clustering, other types of clustering algorithms may include k-medians, expectation maximization (EM), and hierarchical clustering.

Much like clustering algorithms, dimensionality reduction algorithms seek and exploit the inherent structure in the data, but in this case in an unsupervised manner to summarize, order and describe data using less information. Dimensionality reduction algorithms can be helpful to visualize dimensional data or to simplify data which can then be used in a supervised learning method. Many of these dimensional methods can be adapted for use alongside classification and regression techniques. Examples of dimensionality reduction algorithms may include Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA).

Association rule learning algorithms are analytical algorithms that extract rules that best explain observed relationships between the variables and the data received by the analytics engine 118. The rules extracted from the data can uncover important and commercially useful associations in large multidimensional datasets, such as some embodiments of the user preference information, psycholinguistic information and demographic information creating the user profile having a plurality of preferred musical parameters. Examples of association rule learning algorithms may include Apriori algorithms and Eclat algorithms.

Ensemble algorithms are models composed of multiple weaker models that are independently trained and whose predictions are combined in some way to make the overall prediction. Determining which models to combine and the ways to combine them may vary depending on the type of information provided to the analytic engine, however popular ensemble algorithms that may be used for determining an appropriate music recommendation may include Boosting, Bootstrapped Aggregation (Bagging), AdaBoost, Stacked Generalization (blending), Gradient Boosting Machines (GBM), Gradient Boosted Regression Trees (GBRT) and Random Forest.

Based on the user preference data 101 and information collected about the user, the analytics engine may use one or more of the analytic techniques described above to organize the data into a model, which may be used to make future predictions about the user. The model may be continuously updated as new user information is supplied to the analytics 118 engine. Using the modeling data stored in the modeling data repository 119, the analytics engine may create and update the user's profile to reflect the most up to date and accurate preferred musical parameters of the user. These preferred musical parameters of the user profile may act as a basis for comparing songs, artists, albums and other musical media to make a determination whether a recommendation should be made to the user.

In some embodiments, the music recommendation engine may include a music repository 103 that is stored either locally on the touch point device 104, accessible via a physical or virtual network or cloud network. The music repository 103 may include a catalog of music, artists, songs, albums, performances and other music related information categorized by each of the parameters of the preferred musical parameters, including classifications of genre, tempo, key, recording date, artist, instrumental accompaniment (guitar, drums, woodwinds, brass, acapella, stringed instruments, full orchestra, etc.) pitch, volume, lyrical sentiment, time signature, and any other parameter that may be used to classify the characteristics of a musical arrangement and song.

The musical recommendation engine may request and retrieve from the music repository 103, music, songs, albums, artists and performance information that similarly reflects the preferred musical parameters of the user profile stored in the operational data store 112. The musical information being retrieved from the music repository 103 may be sent to a staging data repository 114. In the staging repository, the analytics engine may compare and contrast the candidates selected from the music repository 103 with the preferred musical parameters of the user. The offer predictive analyzer 126 of the analytics engine 118 may detect one or more patterns between the musical candidates for the recommendation and the preferred musical parameters of the user. The predictive offer analyzer 126 may further make decisions regarding the best candidate for recommending to the user by using a Constrained Markov Decision Process.

Embodiments of the predictive offer analyzer may proceed to tabulate or calculate a score for each of the musical recommendation candidates retrieved from the music repository 103. In some embodiments, the scoring of each musical candidate is made for each known parameter and compared with preferred musical parameters of the user. The scoring may calculate the amount of similarity for each known parameter to the preferred parameters, the overall similarity of the recommendation and the amount of "surprise" or dissimilarity with the preferred parameters. In some embodiments, the goal for making the recommendation to the user is to identify the music candidate from the music repository 103 that may offer the greatest amount of surprise, but still be similar enough to the preferred music parameters to be considered enjoyable by the user.

In order to achieve the goal of recommending music the user will enjoy, while still not entirely deviating from the preferred music parameters, one or more of the music parameters from the candidate may be significantly varied from one or more preferred music parameters. The phrase "significantly varied" may refer to a value of a musical parameter deviating outside a specified threshold range of variation considered to be enjoyable according to the user profile. The amount of deviation may also differ from musical parameter to parameter. In some embodiments the amount of deviation may be ±1, ±2 or ±3 standard deviations from the preferred parameter, depending on the musical parameter and the personality of the user. In some embodiments, the allowable deviation of a calculated music parameter may be between ±1-5%, ±1-10%, ±1-15%, ±1-25%, ±1-33%, ±1-50%, ±1-75% of the calculated value or more. Embodiments of the music recommendation engine may surprise and delight users by having only a substantial amount of the parameters being within the threshold range, but not all of the parameters. A substantial amount of parameters may be at least 50%, at least 60%, at least 70%, at least 80%, at least 90%, or at least 95% of the parameters of the recommendation candidates being within the threshold of the preferred music parameters.

The past preferences, and the amount of deviation considered preferable may be dependent upon the collected user information, and rules set up by the user or the programmers of the music recommendation engine. In other embodiments, the psychological variables of the user may indicate whether more or less deviation would be considered acceptable to a user. For example, user's having psychological variables indicating that they are more relaxed, outgoing or tolerant may indicate that the user may have a higher tolerability for greater deviation from the preferred preferences.

For example, the user profile may indicate that the user has a preferred tempo of music that ranges between 125 bpm±20 bpm. A song having 160 bpm falls outside of the ±25 bpm threshold value of variation allowable and thus is significantly varied from the preferred music parameters. In another example, Table 1 provides a hypothetical instance within the musical recommendation engine wherein three potential song candidates are scored for their similarity and surprise factors:

TABLE 1

| | Genre | Similarity | Tempo (BPM) | Similarity | Sentiment | Similarity | Overall Similarity | Surprise |
|---|---|---|---|---|---|---|---|---|
| Past Preferences | Rock (94%) | 90% ± 10% | 125 ± 20 | 90% ± 10% | 0.3 ± 0.1 | 90 ± 10% | | |
| Song 1 | Rock | 94% | 130 | 98% | 0.26 | 92% | 0.848 | 0.160 |
| Song 2 | Rock | 94% | 150 | 70% | 0.35 | 90% | 0.592 | 0.460 |
| Song 3 | Blues | 30% | 130 | 98% | 0.27 | 92% | 0.270 | 0.800 |

The scoring of each recommendation may be performed by the offer analyzer 126 of the analytics engine. Using the model data, and analytics algorithms, each parameter can be assigned a value. These values may be preassigned and stored in the music repository 103 or the analytics engine may evaluate the candidates' properties and assign a score for each relevant musical parameter. Additionally, the offer analyzer 126 of the analytics engine may compare the values of each parameter and the preferred music parameters of the user and assign a score based on this comparison and the similarity between the preferred music parameters and the candidate. As shown above in table 1, each parameter of the candidate may be scored separately and each candidate may be assigned an overall similarity score as well as a surprise score, which is an assigned value that estimates the amount of difference between the musical candidate and the preferred parameters.

In some embodiments, the musical recommendation engine may select the musical candidate to deliver to the user as recommendation by selecting the candidate with the highest recommendation value. The recommendation value may be a weighted combination of the similarity value for each of the musical parameters and the surprising characteristics that are a deviation from the preferred musical parameters of the user. The recommendation value balances the amount of similarity and surprise that would be tolerable to a user, to retrieve a relative value for comparing each of the song candidates. The weighting of each value to arrive at the recommendation value may vary from user to user. The recommendation may depending on the demographics of the user, the preferred parameters, psycholinguistic variables including the user's personality traits, or the user may set how much surprise or deviation in the recommendation engine. In some embodiments, the method for calculating the recommendation value may be performed using the general formula ((similarity value)x*(surprise value)y) or (x*similarity value)+(y*surprise value). The values of x and y may vary depending on how much surprise and similarity is desired by the user, or determined by the musical recommendation engine as being within a tolerable range, based on the user's profile. The variables x and y can be any numerical value desired. For instance in some embodiments, x and y can be integers between 1-10, 1-20, 1-50, 1-75, 1-100 or greater and any combination or variation in between. In some embodiments, x and y can have different ranges of value, for instance, x may be between 1-20 and while y may be between 1-10. In the exemplary embodiment below, the formula for calculating the recommendation value may be where x=2 and y=1, thus resulting in ((similarity value)2*(surprise value)):

A song that is 90% similar, and 5% surprise=$0.90^2 \times 0.5 = 0.0405$

A song that is 85% similar and 20% surprise=$0.85^2 \times 0.2 = 0.1445$

A song that is 100% similar with 0% surprise=$1^2 \times 0 = 0$

Using the example provided above, if the recommendation candidates were between the three songs listed having the similarity and surprise scores above, the music recommendation engine may select the song having the highest recommendation value, which is 0.1445 in this example. This song, out of all the candidates provided the maximum amount of similarity and surprise, so the user may be most likely to consider this the most appealing and best recommendation. In alternative embodiments, the amount of surprise considered acceptable may be dependent on the profile information about the user. The music recommendation engine may determine from user information that a user having a type A personality (ambitious, sensitive, outgoing, etc.) may appreciate and enjoy music recommendations having higher deviations from the preferred parameters and more surprise when it comes to tempo, time signatures, and genre. Alternatively, a user having a type B personality (open and agreeable personality) may be determined to enjoy more variation in lyrical sentiment and musical accompaniment. Accordingly, the musical recommendation engine can be adjusted to select musical candidates with higher levels of surprise in the parameters that the personality type may enjoy more deviations from the preferred musical parameters.

Embodiments of the user profile and the preferred musical parameters may be generated and updated in real time, near real time, and may be adjusted for context specific situations where the type of music or attributes preferred may vary under the circumstances the user is experiencing in the real world. Music recommendations that have been selected and scored may be stored in the operational data store 112 and may be delivered when triggered to do so under specific contexts, in accordance with relevant business rules stored in the offer delivery manager 106. Using context specific recommendations may ensure that the most relevant and real-time conditions are constantly updated to allow a recommendation to be delivered to the user under situations that make the most sense. In some embodiments, the preferred musical parameters may change or be altered under context specific situations. Music that may be considered similar or surprising in the morning, during the week, or during work hours, may not be considered a good recommendation for the user at night, on the weekend or in large groups. The user profile may include context specific sub profiles stored in the operational data store 112. These sub profiles may substitute for the default preferred music parameters under context specific situations. Under one or more specific contexts, the analytics engine may compare and score music repository candidates against the context specific music parameters of a selected sub profile, to make a music recommendation that would be considered acceptable under specific conditions. Contexts which a sub profile having its own context specific music parameters may include contexts such as time of day, day of the week, GPS location, including home, office, vacation, travelling in a vehicle, whether in a group of individuals or listening solo, the touch point device the music recommendation engine is being accessed from, listener's mood and the specific selection of a user defined sub-profiles.

Embodiments of the music recommendation engine may organize, and store one or more music recommendations that have been scored and analyzed by the analytics engine to be an appropriate mixture of surprising and similar to the user's preferred music preferences in the operational data store 112. The stored music recommendations may subsequently be staged in the staging data repository 114 prior to being delivered to the user's touch point device 104. In some embodiments, the music recommendation engine may be equipped with a recommendation delivery manager 106. The recommendation delivery manager 106 may select the appropriate music recommendation from the staging data repository and deliver the music recommendation under the appropriate circumstances based on the recommendation value, specific real world context, and the interactions between the user and the music recommendation engine.

Embodiments of the recommendation delivery manager 106 may deliver selected music recommendation from the operational data store 112, or staging data repository 114, to the user's touch point device 104. Embodiments of the music recommendation may be classified differently depending on the type of recommendation being delivered. The recommendation may be considered a public recommendation, or a private recommendation. Public recommendations may include publicly held music events, such as concerts, festivals, meet and greets album signings, book tours or any other public music event. Conversely, private recommendations may include recommended songs, albums, artists, music videos, live performance/concert videos.

In some embodiments, the music recommendation engine may be delivered to the user by the recommendation delivery manager 106 at pre-designated intervals of time, upon request by the user, following the completion or conclusion of a currently playing music selection or under context specific situations. For example, the recommendation delivery manager 106 may be pre-programmed with programmer defined rules for delivering music recommendation and/or user defined rules for when music recommendations should be delivered to the touch point device. The rules may also be dependent upon the programming parameters of the specific application 105 or the web interface 107 that the user is accessing the music recommendation engine from.

In some embodiments of the music recommendation engine, a user may specifically request a recommendation, for instance, directly from the touch point device 104. The user may specifically request that a music recommendation be delivered to the touch point device from the music recommendation engine, for example using push or pull notifications to deliver recommendation requests. Alternatively, in other embodiments, the touch point device 104 may be equipped with a natural language processor 108 capable of receiving requests and even user information when the user speaks to the touch point device 104. The natural language processor 108 refers to computing hardware or software that allows for a computing system, such as the touch point device 104 to derive meaning from a human or natural language input. For instance, the input can be in the form of a spoken request to a device, such as a spoken request for a recommendation, information about the user's mood, or the types of songs the user prefers at the moment the request is made. Accordingly, in response to the human language input, the music recommendation engine can generate and deliver a music recommendation in accordance with the user's context and preferred music parameters of the user's stored profile.

The music recommendation may continue to improve its recommendation accuracy by providing opportunities for users to give feedback regarding the recommendations received. The music recommendation engine may provide opportunities for the user to rate the recommendations, like/dislike recommendations, purchase songs, albums and artists recommended through the application 105 or web interface 107, and purchase concert tickets or report whether or not the user attended live public events that were recommended by the music recommendation engine. In some embodiments, the music recommendation may allow for user's to share their recommendations and experiences via a network to other users of the music recommendation engine. This feedback provided by the user may be collected as part of the collected user information and user preference data 101, and may be used to update the user's profile and influence future music recommendations.

The data I/O manager 110 in communication with the touch point device 104 may deliver the feedback and input entered into the touch point device from the user to other entities of the music recommendation engine. For instance, when a user rates, likes/dislikes, or comments about the music recommendation engines recommendations, this data may be returned to the staging data repository 114, operational data repository 112 and/or the analytics engine 118 to further update the user profile and the preferred music parameters. The data I/O manager may also provide feedback and update the categorized music in the music repository 103. The user may update the described parameters of one or more entries in the repository or provide new music to save to the repository that may not have had a previous entry. Since the music repository may be shared between multiple users and multiple touch point devices 104 on a network or through the internet, the new music categorized or added to the music repository 103 may increase the music recommendation engine's library of possible recommendations for additional users of the recommendation services.

Figure 2:
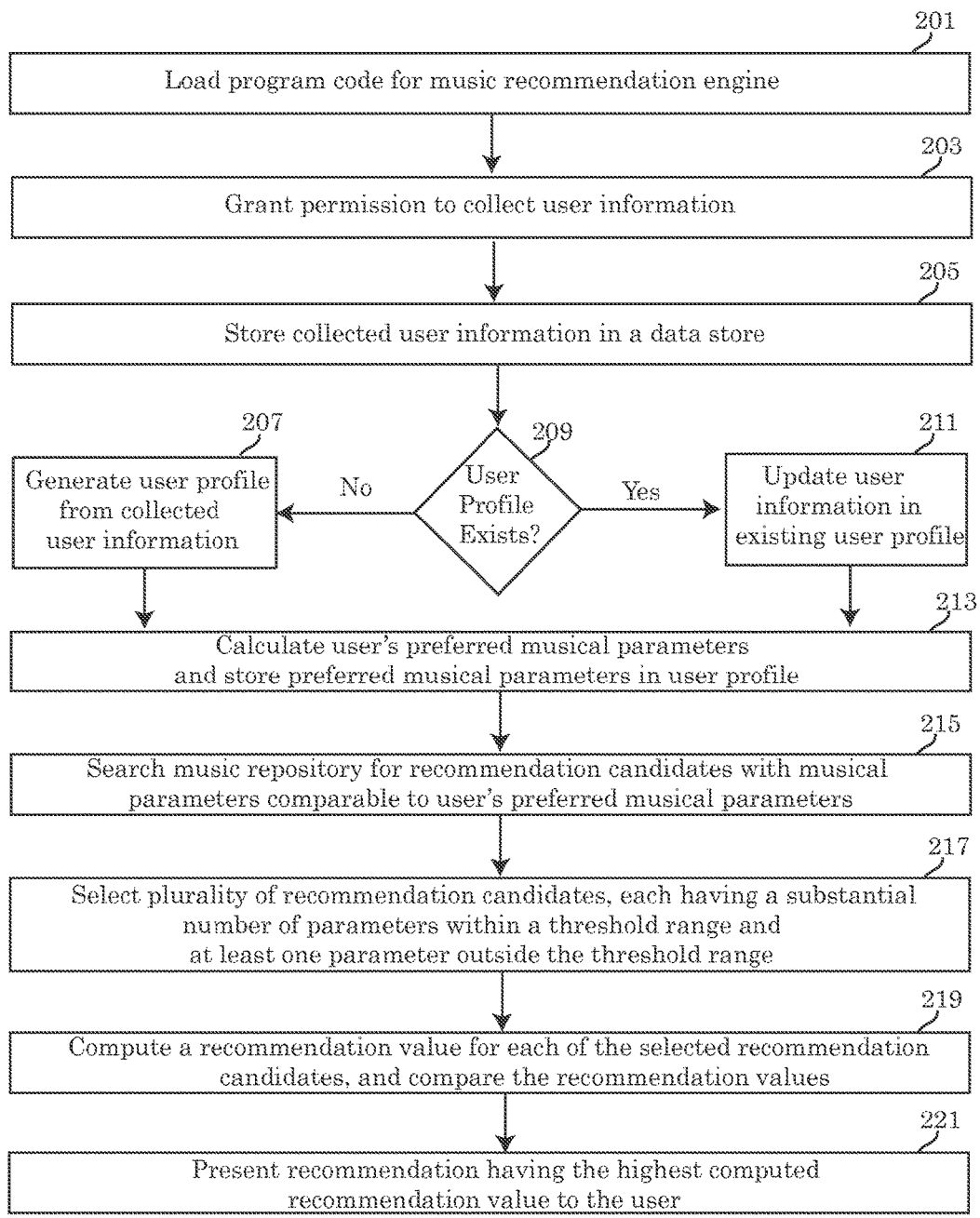
FIG. 2 is a flow chart describing a method for recommending music to a user of a computing system, in accordance with the embodiments of the present invention.

Referring to FIG. 2, describing a method for generating a music recommendation, the method may be implemented with the architecture, including both hardware and software described in accordance with FIG. 1. The flow chart of FIG. 2 implementing a method for generating a music recommendation, may implement procedures that vary from those specifically described. The example method shown in FIG. 2 or any other figures in this disclosure should not be construed as limiting embodiments of the present disclosure. Furthermore, each of the steps in the algorithm of the figures may be enabled and executed in any order by a computer processor executing computer code.

Embodiments of step 201 of the method may comprise loading program code for the music recommendation engine into a computing system, such as the touch point device 104. Once the programming code is loaded in step 201, the touch point device 104 may display the application 105 on the display or interface of the touch point device 104. Alternatively, when the application is accessible through a website or web based service, the web interface 107 may be displayed on the display of the touch point device 104.

In embodiments of step 203, the user may grant permission to the music recommendation engine to collect user preference data 101 and other user information from one or more accessible data sources 103 which may be accessible locally on the touch point device 104, accessible via a computer network, or from data sources available on the internet. The step of granting permission may be made by the user of the music recommendation engine. The user may select from the interface of the touch point device one or more options or settings allowing the music recommendation to have access to user information stored locally on the touch point device 104 and data sources 103 accessed remotely over a network. The user may grant permission to collect user information upon installing or accessing the music recommendation engine for the first time, or the request may be made every time the music recommendation engine is accessed.

Once permission has been granted to the music recommendation engine to collect user information, the recommendation engine may proceed to gather and collect user preference data and other information about the user from one or more data sources 103 as described above. Under step 205, the user information may be stored in one or more data stores. In the exemplary embodiment described in FIG. 1, the data store where the collected user information is stored is the operational data store 112. Additionally, under step 209, the music recommendation engine may make the determination of whether the current user currently has an existing profile or a new profile needs to be created. The determination may be made by identifying whether the current user name or user ID has logged into the music recommendation engine before. If this is the first time the user name has logged in, granted permission to collect user information or there is an absence of a user profile having any preferred music parameters stored in the operational data store 112, the music recommendation engine may make determination that a new profile should be generated under step 207 and tied to the currently logged in user name. Conversely, if a user profile already exists, the music recommendation engine may select the profile and proceed to perform the method under step 207 to update the user profile with the newly collected user information of step 205 and make recommendations in accordance with the remaining steps of this method.

In step 213 of the method for generating a music recommendation, the music recommendation engine may proceed to calculate the user's preferred musical parameters and store these parameters in the newly created user profile of step 207 or update the profile of step 211. Step 213 may be performed by the analytics engine 118 analyzing the stored user information of step 205. The preferred music parameters may be calculated and consistently adjusted in real time or near real time. The analytics engine 118 may use predictive analytics to forecast future behaviors of the user based on the user preference data 101 being stored and sent to the analytics engine 118 for analysis. Namely, the analytics engine may predict the user's preferred musical parameters and predict a musical recommendation that will be considered enjoyable to the user. The analytics engine 118 may identify the preferred music parameters by applying one or more of the machine learning models 124 and profile analyzer 120 to the user preference data 101, demographic variables and psycholinguistic variables (including personality, lifestyle and social class). In some embodiments, the analytics engine may further analyze the data using the pattern detection analyzer 122 to detect matching analytical models to compare and contrast the user's profile with other profiles of different users accessible to the music recommendation engine. Following the calculation of the user's preferred parameters; these preferred parameters may be added or updated to the profile stored in the operational data store.

Once the preferred musical parameters have been calculated in step 213, the music recommendation engine in step 215 may search music repository 103 for recommendation candidates classified as having musical parameters comparable or similar, but not identical to the user's preferred musical parameters. Each of the pieces of music stored in the music repository may be categorized and classified with values of one or more parameters that correspond to one or more of the preferred music parameters of the user profile. The similarities of the music stored in the repository may be evaluated by the analytics engine 118 to determine the best candidates from the music repository 103 to recommend to the user. Once the best candidates for the recommendation are identified, the music recommendation engine in step 217 may select a plurality of one or more candidates, each having a substantial number of parameters within a threshold range of acceptability based on the user's preferred music parameters. Additionally, the candidate selected may include at least one parameter outside of the acceptable threshold. This outlying parameter may offer the unique surprise or delightful aspect to the music that the user may not have considered on their own that they may have enjoyed.

In step 219, the music recommendation computes the similarity and surprise scores for each recommendation selected in step 217. Each selected candidate is scored and compared for its similarity in each parameter against the user profile's preferred musical parameters using one or more algorithms and data models of the analytics engine 118 and more specifically, in some embodiments the offer predictive analyzer 126. Furthermore, step 219 may further include computing a recommendation value for each of the selected recommendation candidates. As noted above, the recommendation may be calculated by the multiplying the (overall similarity score)x times the (surprise score)y. This recommendation value calculation may assist to determine the recommendation that offers the most applicable balance of similarity and surprising qualities that a user would enjoy listening to, while being flexible enough to weight the similarity and surprise values based on the user's profile in order to avoid selecting music that is too familiar or too surprising.

These recommendation values are compared to one another in the staging data repository and/or the operational data store, and in some embodiments, step 221 includes presenting the recommendation having the highest computed recommendation value to the user via the touch point device 104. Step 221 may be implemented by the recommendation delivery manager 106, which may deliver the music recommendation from the staging data repository computed to have the highest recommendation value, and present the recommendation to the touch point device. In some embodiments, multiple recommendations may be queued in the staging data repository 106 and delivered by the recommendation delivery manager 106 from the staging data repository 106 to the touch point device 104, when the appropriate context arises, to ensure that the most appropriate recommendations are being delivered to the user at the most appropriate and desired times.

Figure 3:
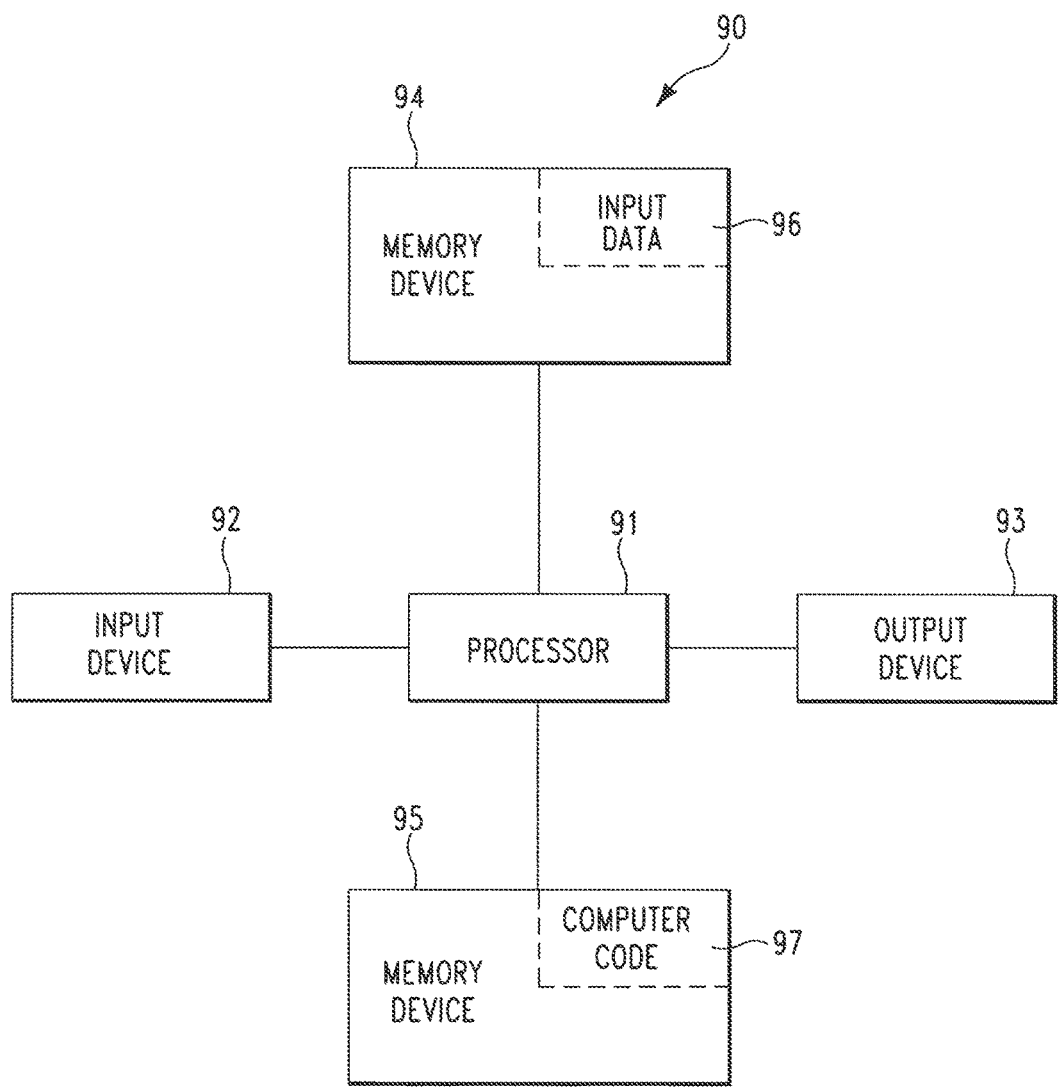
FIG. 3 illustrates a computer system used for recommending music to a user, in accordance with embodiments of the present invention.

FIG. 3 illustrates a computer system 90 used for generating a music recommendation, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for generating a music recommendation. The processor 91 executes the computer code 97. The memory device 94 includes input data 96. The input data 96 includes input required by the computer code 97. The output device 93 displays output from the computer code 97. Either or both memory devices 94 and 95 may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of performing a method for generating a music recommendation.

FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for dynamically generating a music recommendation to a user in real-time, said method comprising:
    granting, by a processor, permission to dynamically collect user information in real-time from one or more data sources;
    dynamically analyzing, by the processor in real-time, the user information to identify psychological variables of the user;
    storing, by the processor, the user information and the psychological variables of the user in a data store;
    dynamically generating, by the processor in real-time, a user profile from the user information, said user profile comprising preferred music parameters and the psychological variables of the user;
    dynamically selecting, by the processor in real-time, a plurality of music recommendation candidates from a repository, said plurality of music recommendation candidates each having a plurality of parameters within a threshold range of the preferred music parameters, wherein at least one parameter is outside the threshold range;
    dynamically analyzing, by the processor in real-time, the preferred music parameters and the psychological variables;
    dynamically computing, by the processor in real-time, a similarity value and a surprise value for each of the music recommendation candidates;
    dynamically further computing, by the processor in real-time, a recommendation value for each music recommendation candidate that balances the similarity value and the surprise value, wherein the recommendation value is calculated by the processor using the general formula ((similarity value)$^x$*(surprise value)$^y$) or (x*similarity value)+(y*surprise value), wherein x and y are integers selected between 1 and 100; and
    dynamically updating, by the processor in real-time, a presentation to the user of the music recommendation candidate having the highest recommendation value.

2. The method of claim 1, wherein the user information being collected dynamically in real-time includes data or metadata describing the user's music purchases, streaming habits, downloading habits, viewing habits, logs of viewed websites, published comments, ratings or reviews.

3. The method of claim 2, wherein the user information being collected dynamically in real-time further comprises user demographic information selected from the group consisting of marital status, family members, education, employment, income, perceived socio-economic status and a combination thereof.

4. The method of claim 1, wherein the plurality of parameters within the threshold range is at least 80% of the preferred music parameters.

5. The method of claim 1, wherein the preferred music parameters include preferences of music selected from the group consisting of genre of music, tempo, time signature, recording date, musical key, pitch distribution, volume, instrumental accompaniment, sentimental analysis of lyrics and a combination thereof.

6. The method of claim 1, wherein the threshold range is ±1-y % of each value of the preferred music parameters, where y is selected from the group consisting of 5, 10, 15, 25, 33, 50, and 75.

7. The method of claim 1, further comprising providing at least one support service for at least one of creating, integrating, hosting, maintaining, and deploying computer-readable program code in a computer system, where the computer-readable program code in combination with the computer system is configured to implement the granting, the dynamic analyzing, the storing, the dynamic generating, the dynamic selecting, the dynamic computing, the dynamic further computing, the presenting, and the dynamic updating.

8. A computer program product, comprising one or more computer readable hardware storage devices having computer readable program code stored therein, said computer readable program code containing instructions executable by one or more processors of a computer system to implement a method for dynamically generating a music recommendation to a user in real-time, said method comprising:
    granting, by the one or more processors, permission to dynamically collect user information in real-time from one or more data sources;
    dynamically analyzing, by the one or more processors in real-time, the user information to identify psychological variables of the user;
    storing, by the one or more processors, the user information and the psychological variables of the user in a data store;
    dynamically generating, by the one or more processors in real-time, a user profile from the user information, comprising preferred music parameters and the psychological variables of the user;
    dynamically selecting, by the one or more processors in real-time, a plurality of music recommendation candidates from a repository, said plurality of music recommendation candidates each having a plurality of parameters within a threshold range of the preferred music parameters, wherein at least one parameter is outside the threshold range;

dynamically analyzing, by the one or more processors in real-time, the preferred music parameters and the psychological variables;

dynamically computing, by the one or more processors in real-time, a similarity value and a surprise value for each of the music recommendation candidates;

dynamically further computing, by the one or more processors in real-time, a recommendation value for each music recommendation candidate that balances the similarity value and the surprise value, wherein the recommendation value is calculated by the processor using the general formula ((similarity value)$^x$*(surprise value)$^y$) or (x*similarity value)+(y*surprise value), wherein x and y are integers selected between 1 and 100; and dynamically updating, by the processor in real-time, a presentation to the user of the music recommendation candidate having the highest recommendation value.

9. The computer program product of claim 8, wherein the user information being collected dynamically in real-time includes data or metadata describing the user's music purchases, streaming habits, downloading habits, viewing habits, logs of viewed websites, published comments, ratings or reviews.

10. The computer program product of claim 9, wherein the plurality of parameters within the threshold range is at least 80% of the preferred music parameters.

11. The computer program product of claim 8, wherein the preferred music parameters include preferences of music selected from the group consisting of genre of music, tempo, time signature, recording date, musical key, pitch distribution, volume, instrumental accompaniment, sentimental analysis of lyrics and a combination thereof.

12. The computer program product of claim 8, wherein the threshold range is ±1-y % of each value of the preferred music parameters, wherein y is selected from the group consisting of 5, 10, 15, 25, 33, 50 and 75.

13. An interactive jukebox, said interactive jukebox comprising:

a processor, a memory coupled to the processor, and a computer readable storage device coupled to the processor, said computer readable storage device containing program code executable by the processor via the memory to implement a method for dynamically generating a music recommendation for a user in real-time, said method comprising:

granting, by the processor, permission to dynamically collect user information in real-time from one or more data sources;

dynamically analyzing, by the processor in real-time, the user information to identify psychological variables of the user;

storing, by the processor, the user information and the psychological variables of the user in a data store;

dynamically generating, by the processor in real-time, a user profile from the user information, comprising preferred music parameters the psychological variables of the user;

dynamically selecting, by the processor in real-time, a plurality of music recommendation candidates from a repository, said plurality of music recommendation candidates each having a plurality of parameters within a threshold range of the preferred music parameters, wherein at least one parameter is outside the threshold range;

dynamically analyzing, by the processor in real-time, the preferred music parameters and the psychological variables;

dynamically computing, by the processor in real-time, a similarity value and a surprise value for each of the music recommendation candidates;

dynamically further computing by the processor in real-time, a recommendation value for each music recommendation candidate that balances the similarity value and the surprise value, wherein the recommendation value is calculated by the processor using the general formula ((similarity value)$^x$*(surprise value)$^y$) or (x*similarity value)+(y*surprise value), wherein x and y are integers selected between 1 and 100; and dynamically updating, by the processor in real-time, a presentation to the user of the music recommendation candidate having the highest recommendation value.

14. The interactive jukebox of claim 13, wherein the user information being collected dynamically in real-time includes data or meta data describing the user's music purchases, streaming habits, downloading habits, viewing habits, logs of viewed websites, published comments, ratings or reviews.

15. The interactive jukebox of claim 14, wherein the plurality of parameters within the threshold range is at least 80% of the preferred music parameters.

16. The interactive jukebox of claim 13, wherein the preferred music parameters include preferences of music selected from the group consisting of genre of music, tempo, time signature, recording date, musical key, pitch distribution, volume, instrumental accompaniment, sentimental analysis of lyrics and a combination thereof.

17. The interactive jukebox of claim 13, wherein the threshold range is ±1-y % of each value of the preferred music parameters, wherein y is selected from the group consisting of 5, 10, 15, 25, 33, 50 and 75.

* * * * *